US007689645B2

(12) United States Patent
Thione et al.

(10) Patent No.: US 7,689,645 B2
(45) Date of Patent: Mar. 30, 2010

(54) SYSTEMS AND METHODS FOR BROKERING SERVICES

(75) Inventors: Giovanni Lorenzo Thione, San Francisco, CA (US); Martin Henk Van Den Berg, Palo Alto, CA (US)

(73) Assignee: Fuji Xerox Co., Ltd. (JP)

( * ) Notice: Subject to any disclaimer, the term of this patent is extended or adjusted under 35 U.S.C. 154(b) by 1069 days.

(21) Appl. No.: 11/090,824

(22) Filed: Mar. 24, 2005

(65) Prior Publication Data

US 2006/0233342 A1 Oct. 19, 2006

(51) Int. Cl.
*G06F 15/16* (2006.01)
(52) U.S. Cl. ...................................... 709/203
(58) Field of Classification Search ............... 709/203, 709/218, 219
See application file for complete search history.

(56) References Cited

U.S. PATENT DOCUMENTS

| | | | | |
|---|---|---|---|---|
| 6,446,108 | B1* | 9/2002 | Rosenberg et al. | 709/203 |
| 6,480,861 | B1* | 11/2002 | Kanevsky et al. | 707/103 Y |
| 6,529,950 | B1* | 3/2003 | Lumelsky et al. | 709/218 |
| 6,631,122 | B1* | 10/2003 | Arunachalam et al. | 370/332 |
| 6,643,650 | B1* | 11/2003 | Slaughter et al. | 707/10 |
| 6,728,267 | B1* | 4/2004 | Giese et al. | 370/469 |
| 6,922,685 | B2* | 7/2005 | Greene et al. | 707/1 |
| 7,478,419 | B2* | 1/2009 | Anderson et al. | 726/1 |
| 2001/0037476 | A1* | 11/2001 | Yamamoto | 714/37 |
| 2002/0169592 | A1* | 11/2002 | Aityan | 704/2 |
| 2003/0004746 | A1* | 1/2003 | Kheirolomoom et al. | 705/1 |
| 2003/0084142 | A1* | 5/2003 | Casati et al. | 709/224 |
| 2003/0105864 | A1* | 6/2003 | Mulligan et al. | 709/225 |
| 2003/0133554 | A1* | 7/2003 | Nykanen et al. | 379/201.01 |
| 2003/0145096 | A1* | 7/2003 | Breiter et al. | 709/231 |
| 2003/0182392 | A1* | 9/2003 | Kramer | 709/217 |
| 2003/0224781 | A1* | 12/2003 | Milford et al. | 455/426.1 |
| 2004/0006589 | A1* | 1/2004 | Maconi et al. | 709/202 |
| 2004/0176976 | A1* | 9/2004 | Boughannam | 705/1 |
| 2005/0198206 | A1* | 9/2005 | Miller et al. | 709/219 |

(Continued)

OTHER PUBLICATIONS

Kuncheva, L., "Diversity in Multiple Classifier Systems", Information Fusion 6 (2005) 3-4, Elsevier 2004 (available online May 19, 2004).

(Continued)

*Primary Examiner*—Salad Abdullahi
*Assistant Examiner*—Imad Hussain
(74) *Attorney, Agent, or Firm*—Sughrue Mion, PLLC

(57) ABSTRACT

Techniques are provided to determine service data features from an archive of web service transactions. Data features for functionally identical classes of service are determined. Differentiating data feature patterns uniquely identifying each service within the class are learned using machine learning, clustering, statistical analysis and the like. A service map associating services with the differentiating patterns is determined. The service map contains data feature patterns that differentiate among otherwise functionally identical services. The data features are optionally associated with past usage, objective and subjective service quality measurements and the like. The data features of the received service requests are compared to differentiating patterns in the service map. The service associated with the differentiating patterns matching the data features of the service request is selected. The data features of the service request may include, but document language, document genre, number of words or characters, type of images, subject matter of images and the like.

18 Claims, 14 Drawing Sheets

U.S. PATENT DOCUMENTS

2006/0020939 A1* 1/2006 Fellenstein et al. ............. 718/1

OTHER PUBLICATIONS

The Open Agent Architecture (OAA) description, SRO International, downloaded from www.ai.sri.com/~oaa on or about Feb. 7, 2005.

Azevedo, V., Mattosa, M., Pires, P., "Handling Dissimilarities of Autonomous Equivalent Web Services", in Workshop on Web-Services, e-Business and the Semantic Web (WES) Foundations, Models, Architecture, Engineering (Caise 2003) Klagenfurt/Velden Austria, 2003.

Verheecke, B., Cibran, M., Jonckers, V., "AOP for Dynamic Configuration and Management of Web Services", ICWS-Europe 2003, in Lecture Note in Computer Sciences vol. 2853, pp. 137-151, 2003 Springer-Verlag, Berlin Heidelberg 2003.

Duin, R., "The Combining Classifier: to Train or Not to Train?", 16th International Conference on Pattern Recognition (ICPR'02) vol. 2, Aug. 12-15, Quebec City, 2002.

Xu, L., Krzyzak, A., Suen, C., "Methods of Combining Multiple Classifiers and Their Applications to Handwrighting Recognition", IEEE Transactions on Systems, Man and Cybernetics, vol. 22(3), May/Jun. 1992, pp. 418-435.

Kittler, J., Hatef, M., Duin, R. Matas, J., "On Combining Classifiers", IEEE Transactions on Pattern Analysis and Machine Intelligence, 20(3), Mar. 1998, pp. 226-239.

Tax, D., van Breukelen, M., Duin, R., Kittler, J., "Combining Multiple Classifiers by Averaging or Multiplying?", Pattern Recognition, 33(2000), pp. 1475-1485.

Kuncheva, L., "A Theoretical Study on Six Classifier Fusion Strategies", IEEE Transactions on Pattern Analysis and Machine Intelligence, 24(2), 2002, pp. 281-286.

Tang, L., Class Notes CSM16 Visual Information Systems: Note 4, multiple processor approach, downloaded from http://www.computing.surrey.ac.uk/courses/csm16/ Feb. 18, 2005.

Cisco ICM Software Release 4.5 Script Editor Guide, part 4, target selection, downloaded from http://www.cisco.com/univercd/cc/td/doc/product/icm/icmentpr/icm45doc/scrptedg/ on or about Feb. 18, 2005.

Roli, F., "Tutorial: Fusion of Multiple Pattern Classifiers", AIIA Sep. 23, 2003, University of Cagliari, downloaded from http://www.diee.unica.it/informatica/en/publications/papers-prag/MCS-Tutorial-02(Part4).pdf Feb. 18, 2005.

* cited by examiner

| SERVICE CLASS ID | SERVICE ID | DOCUMENT | RESULT | QUALITY | COMMENT |
|---|---|---|---|---|---|
| X2HTML | S1 | D1 | R1 | -1 | D1 IS A PDF, S1 RETURNS AN ERROR |
| X2HTML | S2 | D1 | R2 | 150 | |
| X2HTML | S3 | D1 | R3 | 50 | |
| X2HTML | S4 | D1 | R4 | 100 | |
| X2HTML | S1 | D2 | R5. | 50 | |
| X2HTML | S2 | D2 | R6 | -1 | D2 IS A WORD DOC, S1 RETURNS ERROR |
| X2HTML | S3 | D2 | R7 | 100 | |
| X2HTML | S4 | D2 | R8 | 75 | |
| X2HTML | S1 | D3 | R5 | -1 | D3 IS A PDF, S1 RETURNS ERROR |
| X2HTML | S2 | D3 | R6 | 200 | |
| X2HTML | S3 | D3 | R7 | 10 | |
| X2HTML | S4 | D3 | R8 | 75 | |
| | | | | . | . |
| | | | | . | . |
| X2WORD | S98 | D99 | R998 | 75 | |

| SERVICE CLASS ID | SERVICE ID | DATA FEATURES | QUALITY |
|---|---|---|---|
| 2BQ73 | S3 | A1B1C2D5E6F0.95 | 0.90 |
| 2BQ73 | S6 | A7B6C4D2E3F0.75 | 0.95 |
| 2BQ73 | S7 | A1B1C2D5E5F0.80 | 0.90 |
| . | . | . | |
| B55C4 | S4 | A2C5D6E7F0.89 | 0.80 |

| ID | SERVICE CLASS ID | SERVICE ID | REQUESTOR ID | DOCUMENT TYPE | WORD LENGTH | SENTENCE LENGTH | READ-ABILITY | LANGUAGE | DOMAIN | DOCUMENT | RESULT | QUALITY |
|---|---|---|---|---|---|---|---|---|---|---|---|---|
| 1 | 9EB73 | S1 | 34A76T | TEXT | 5 | 5 | 0.95 | ENGLISH | SALES | D3MLKUSA | RFR564FF1 | 0.95 |
| 2 | 9EB73 | S1 | 34A76T | TEXT | 5 | 5 | 0.60 | ENGLISH | SALES | DFG54SSSS | RFREDCFS | 0.60 |
| 3 | 9EB73 | S1 | 34A76T | TEXT | 5 | 8 | .75 | ENGLISH | TECHNICAL | D4321SDFR | RFR432S4 | 0.81 |
| 4 | 9EB73 | S1 | 34AZ6T | TEXT | 5 | 8 | .60 | | SALES | D45678VSM | RFRDE432 | 0.95 |
| . | . | . | . | . | . | . | . | . | . | . | . | . |
| N | B55C4 | S4 | J73FJK | TEXT | 3 | 5 | 0.89 | ENGLISH | SALES | D4BMZSWD | R4567GTR | 0.87 |

| ID | SERVICE CLASS ID | SERVICE ID | REQUESTOR ID | DOCUMENT TYPE | BITRATE | FORMAT | AMPLITUDE | ENERGY | DOCUMENT | RESULT | QUALITY |
|---|---|---|---|---|---|---|---|---|---|---|---|
| 1 | TVB73 | S2 | 34A76T | AUDIO | 30K | MP-3 | 0.90 | 0.95 | D45FG54S | RRED53S | 0.80 |
| . | . | . | . | . | . | . | . | . | . | . | . |
| . | . | . | . | . | . | . | . | . | . | . | . |
| . | . | . | . | . | . | . | . | . | . | . | . |
| N | Q85C4 | S5 | J73FJK | AUDIO | 60K | MP-4 | 0.82 | 0.89 | D432SWS | RGFR43 | 0.91 |

| ID | SERVICE CLASS ID | SERVICE ID | REQUESTOR ID | DOCUMENT TYPE | FRAME RATE | SIZE | COLORS | ENERGY | SHOT LENGTH | CONTAINS PEOPLE | DOCUMENT | RESULT | QUALITY |
|---|---|---|---|---|---|---|---|---|---|---|---|---|---|
| 1 | 2QB73 | S3 | 34A76T | VIDEO | 6 | 95K | 16M | 0.95 | 2 | Y | D31SEDXA | RCHYT | 0.95 |
| . | . | . | . | . | . | . | . | . | . | . | . | . | . |
| . | . | . | . | . | . | . | . | . | . | . | . | . | . |
| N | LP5C4 | S8 | J73FJK | VIDEO | 6 | 100M | 16M | 0.89 | 2 | Y | D56MNRFFF | RJHYTG | 0.82 |
| 1505 | 1510 | 1515 | 1520 | 1525 | 1530 | 1535 | 1540 | 1545 | 1550 | 1555 | 1560 | 1565 | 1570 |

| ID | SERVICE CLASS ID | SERVICE ID | REQUESTOR ID | DOCUMENT TYPE | SIZE | FORMAT | PEOPLE /FACES | PHOTO/ DRAWING | EXTERIOR /INTERIOR | COLORS | AVERAGE ENERGY | DOCUMENT | RESULT | QUALITY |
|----|------------------|------------|--------------|---------------|------|--------|---------------|----------------|---------------------|--------|----------------|----------|--------|---------|
| 1  | 5VB73            | S9         | 34A76T       | IMAGE         | 1M   | JPEG   | P             | P              | E                   | 16M    | 0.95           | D45GFR4  | RADE45 | 0.81    |
| .  | .                | .          | .            | .             | .    | .      | .             | .              | .                   | .      | .              | .        | .      | .       |
| N  | L15C4            | S12        | J73FJK       | IMAGE         | 103K | PNG    | P             | P              | I                   | 64K    | 0.99           | D789JHT  | R65GT5 | 0.99    |

SYSTEMS AND METHODS FOR BROKERING SERVICES

BACKGROUND OF THE INVENTION

1. Field of Invention

This invention relates to brokering services.

2. Description of Related Art

Conventional distributed processing systems use remote method invocation (RMI), web-services, remote procedure calls (RPC) and other services to perform information processing. These conventional distributed processing systems typically hard-code or embed selected service identifiers into the system. Other conventional distributed processing systems select services using a service discovery system. Conventional service discovery systems, such as the Universal Description, Discovery and Integration service (UDDI), the Web Services Description Language (WSDL) and the Web Service Transactional Language (WSTL) and the like.

Conventional WSDL and WSTL services are further discussed in "Handling Dissimilarities of Autonomous Equivalent Web Services", by Valdino Azevedo, Paulo F. Pires, Marta Mattoso, in Workshop on "Web Services, e-Business, and the Semantic Web (WES): Foundations, Models, Architecture, Engineering and Applications", Conference on the Advanced Information Systems Engineering (Caise 2003), Klagenfurt/Velden Austria, 2003.

Other conventional systems such as the Web Services Management Layer (WSML) use rules to determine the recipient of a service request. The WSML framework is discussed further by Bart Verheecke et al in "AOP for Dynamic Configuration and Management of Web Services", part of the Proceedings of the International Conference ICWS-Europe 2003, in Lecture Notes in Computer Sciences Vol. 2853, pp. 137-151, 2003, Springer-Verlag, Berlin Heidelberg 2003. These conventional routing systems allow for delayed binding of the service to service provider and/or service recovery through re-direction using rules. However, these conventional service discovery systems typically lack adaptable mechanisms to select between services offering the same service within a class of functionally identical services. Thus, systems and methods for brokering services based on data features would be useful.

SUMMARY OF THE INVENTION

The systems and methods according to this invention determine a service map between a service and the data features of a service request. The service map is determined by mining a service transaction repository containing prior service transactions. Exemplary data features associated with each service are determined. The exemplary data features differentiate between service providers offering the same class of service. A class of services is a group of services providing functionally identical services. Various data features, such as document language, genre, as well as the context features of user feedback, objective evaluation, cost, time of performance of the service request are used to determine differentiating patterns associated with each service in the service map. The exemplary data feature patterns associated with a service are matched against the data features associated with the service request. In one embodiment, the service request is routed to the service associated with data feature patterns matching the data features of the service request. The service request is optionally dynamically updated and the updated service map is then used to route new service requests.

BRIEF DESCRIPTION OF THE DRAWINGS

FIG. 6 is a first exemplary service transaction storage structure according to this invention

FIG. 10 is a first exemplary service map according to this invention;

FIG. 11 is a second exemplary service transaction storage structure according to this invention;

FIG. 12 is a third exemplary service transaction storage structure according to this invention;

FIG. 13 is a fourth exemplary service transaction storage structure according to this invention; and FIG. 14 is a fifth exemplary service transaction storage structure according to this invention.

DETAILED DESCRIPTION OF EXEMPLARY EMBODIMENTS

Figure 1:
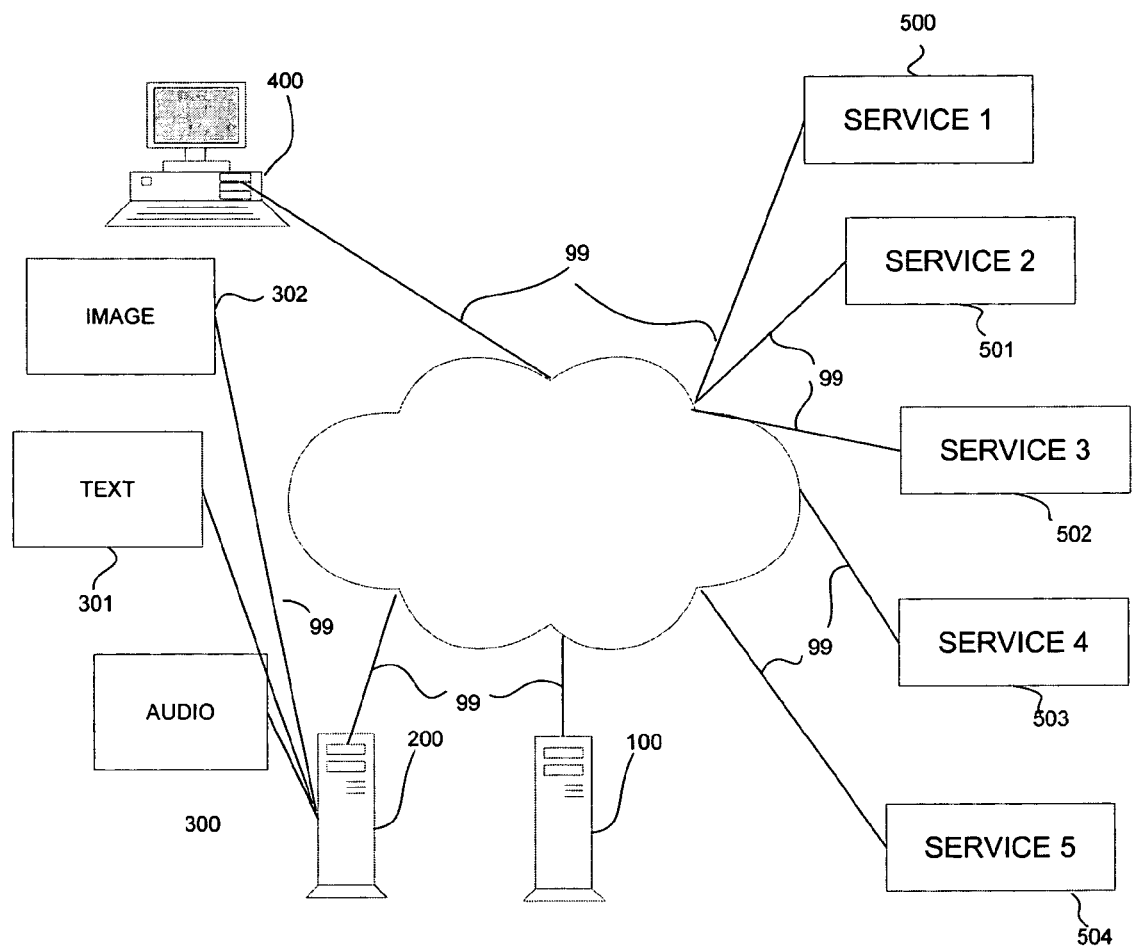
FIG. 1 is an overview of an exemplary system for brokering services according to this invention.

FIG. 1 is an overview of an exemplary system for brokering services 100 according to this invention. The system for brokering services 100 is connected via communication links 99 to services 1-5, 500-504; to a communication-enabled personal computer 400 and to an information repository 200 providing access to audio information 300, text information 301 and image information 302. A user of the communication-enabled personal computer 400 initiates an exemplary service request to translate audio information 300 from English to French. The translation request is mediated by the system for brokering services 100.

The system for brokering services 100 determines data features for the audio information 300. The data features include, but are not limited to, the type of document to be translated, the language, the size, and/or any other features useful in differentiating between similar documents.

In one embodiment, the system for brokering services 100 retrieves a previously determined service map. The service map identifies functionally identical services differentiated by data, quality and contextual features. In various embodiments, the service map is determined based on analysis of the data features, the quality features and/or the context features for each transaction in a service transaction repository. In various embodiments, the service map is initialized to a null or empty state. The newly received service requests are used as training instances to update the service map. Alternately, in other exemplary embodiments according to this invention, the service map is bootstrapped with an initial service map that associates services with exemplary data, context features and quality values. The bootstrapped or initial service map is optionally updated with the data, context and quality features of the new service requests. In various other exemplary embodiments, the service map associated data feature patterns with services. The data feature patterns are based on data context and/or quality features from a service request transaction repository.

The system for brokering services 100 forwards the service request to a service able to perform the requested class of service. The service is determined based on the service map, the service request and the data features of the service request. In various embodiments, the presence of an empty or null service map triggers an optional learning mode. In the optional learning mode, the system for brokering services 100 forwards the service request to one or more services associated with the same service class. The results of each service request are analyzed. The data and context features and quality values associated with the service request are used to update the service map with information about the services able to complete the service request.

For example, services 1-3, 500-502 each offer a functionally identical English-French language translation class of service. The feedback information in the transaction repository is used to update differentiating patterns contained within the service map. The differentiating patterns are determined based on machine learning, statistical analysis and the like. Service requests for services in the same class of service are routed to the appropriate service based on the differentiating patterns stored in the service map. For example, differentiating patterns may indicate preferences by many requestors for service from a specific provider when a "technical genre" data feature is identified within a document.

The data features associated with a service request include, but are not limited to, the language of the document, the genre of the document, the number and type of words in the document and the like. Context features may include, but are not limited to: time, processing load and the like. Quality measurements include objective and subjective evaluations; feedback information and the like. The data and context features and the quality measurements may be encoded individually or contained within a single data-context feature representation without departing from the scope of this invention.

In one exemplary embodiment according to this invention, the system for brokering services 100 uses vectors to represent the data features. The service request data and context feature vectors are compared to data and context feature vectors associated with each service in a service class. In various embodiments, the service request is forwarded to the service associated with the data and context feature vectors most closely matching the data and context feature vectors of the service request.

The requested service is performed and a result obtained. In one example, a service request for an English-French class of translation service is associated with data and context feature vector "RSCV". The service request is forwarded to the service provider with exemplary data and context feature vectors closest to the data and context feature vector "RSCV". The degree of similarity is based on Euclidean distance. However, it will be apparent that any known or later developed method of determining similarity between the data and the context feature representations can also be used in the practice of this invention. A quality measurement for the result of the service request is then determined. The quality measurement is based on user feedback information, comparison to objective measures of accuracy and/or other feedback information. The determined service quality measurement is then used to update the service map.

In one embodiment, when the quality service measurements for a service request indicate the service performs better than the prior "best" service for the determined data and context features, the service map is updated or adjusted. In another embodiment, the differentiating data feature pattern associated with the service is updated to reflect the newly determined best service. The update or adjustment increases the likelihood that the new service is selected for future service requests associated with the same data and context features. The results of the service request are forwarded over the communications links 99 to the user of the communications-enabled personal computer 400.

Figure 2:
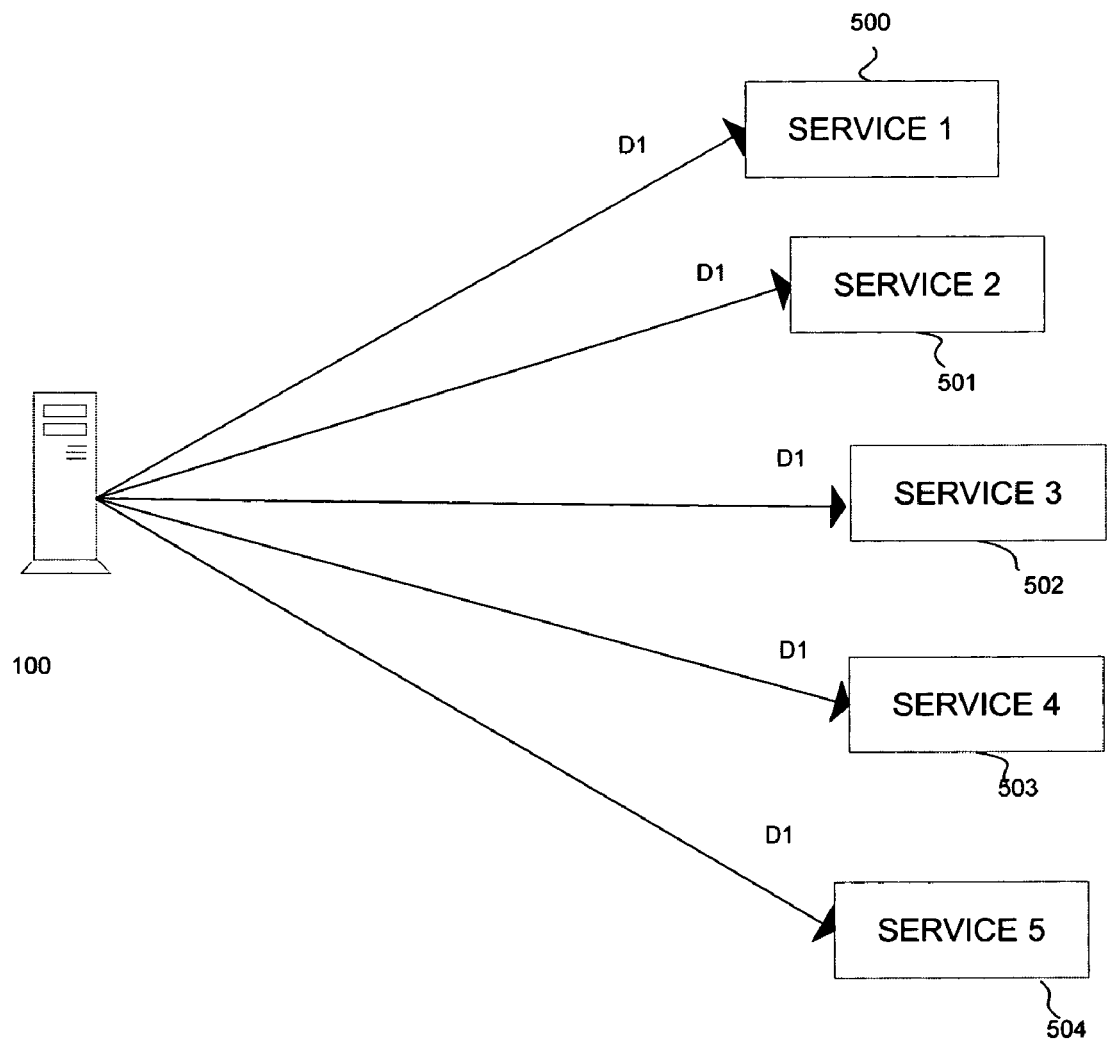
FIG. 2 is a first overview of the logical flow of exemplary training service requests according to this invention

FIG. 2 is a first overview of the logical flow of exemplary training service requests according to this invention. The system for brokering services 100 forwards first service request <X2HTML, SERVICE 1, D1>; second service request <X2HTML, SERVICE 2, D1>; third service request <X2HTML, SERVICE 3, D1>; fourth service request <X2HTML, SERVICE 4, D1> and fifth service request <X2HTML, SERVICE 5, D1> to services 1-5, 500-504. Each service request contains the same text document D1. The requested "X2HTML" service is performed on the text document D1 by each of the services 1-5, 500-504. The results for each of the services 1-5, 500-504 are returned to the system for brokering services 100. Service quality measurements are then determined. For example, in various embodiments, the service quality measurements are based on explicit and/or implicit feedback, objective and/or subjective quality evaluations, comparison to a gold standard, or the like. For example, multiple re-use of a service by a requestor may be used to determine a positive implicit feedback value for a service while non re-use may indicate negative implicit feedback. Automatically generated surveys can be used to gather explicit feedback about a service. Subjective service quality measurements can be determined by user feedback surveys and the like.

The service map is then updated. If no service map exists, a service map is created based on the service request, the data features, the context of the test service request and the determined quality measurements. The service map differentiates between services in a class of service. For example, when the identical data features of document D1 are presented to each service in the "X2HTML" class of service, the result of the service is influenced by the quality of the service; the time of day; the service load; and/or various context features. The data and context features are used to determine differentiating patterns useable to select among services in the service class.

Figure 3:
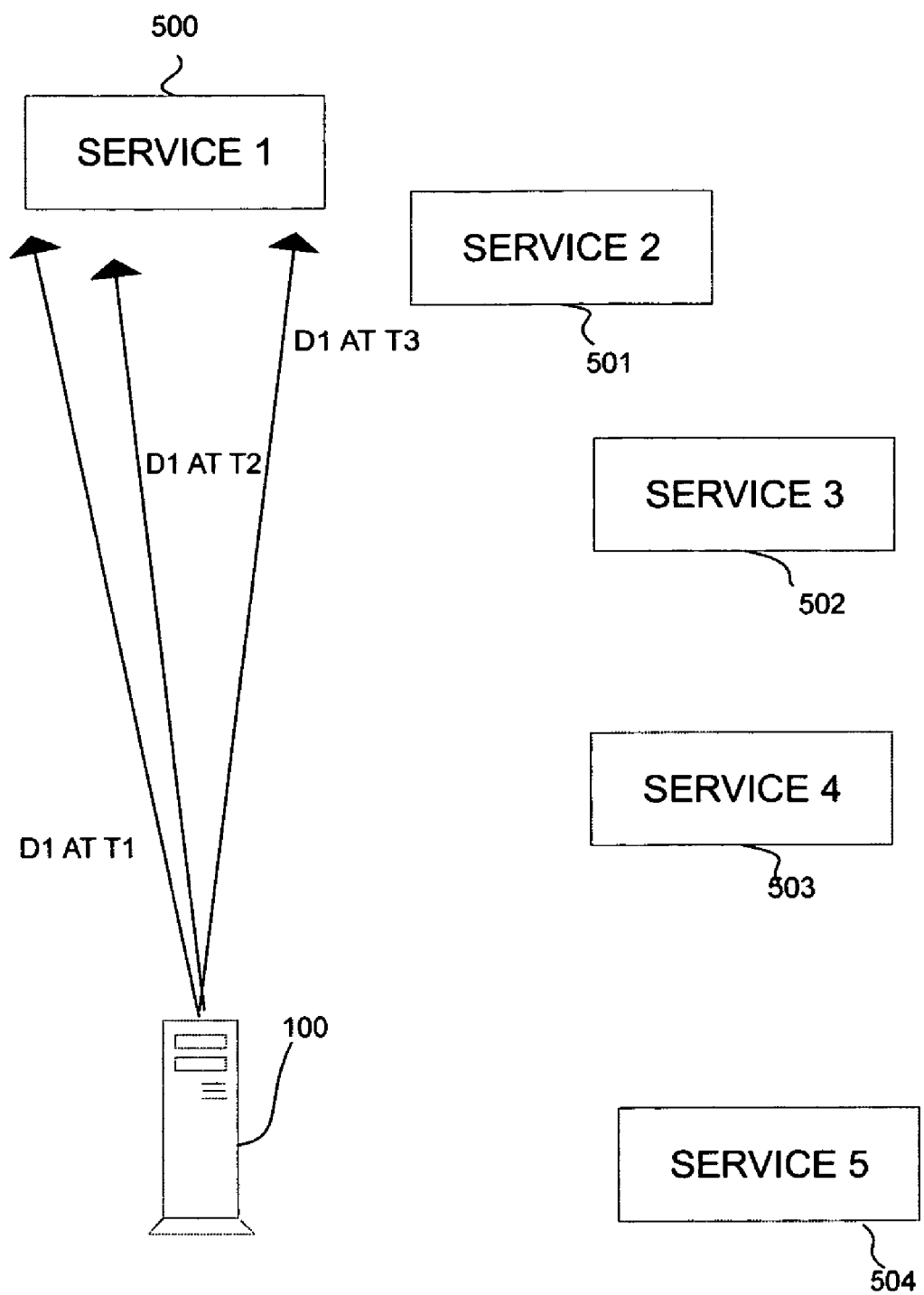
FIG. 3 is a second overview of the logical flow of exemplary training service requests according to this invention.

FIG. 3 is a second overview of the logical flow of exemplary training service requests according to this invention. The system for brokering services 100 forwards a first service request <X2HTML, SERVICE 1, D1, T1>; second service request <X2HTML, SERVICE 1, D1, T2> and third service request <X2HTML, SERVICE 1, D1, T3> to service S1 500. Each service request contains the same test document D1 forwarded to the same service. However, each service request is submitted at varying times. The service request is not forwarded to services 2-service 5, 501-504. Instead the training is limited to the single service 1, 500 over time periods T1-T3. The first, second and third service requests are completed and the results of the multiple service requests are returned to the system for brokering services 100. The system for brokering services 100 analyses the data and context features and the service quality measurements. Differentiating patterns useful in selecting a service from the class of services are determined. For example, in various embodiments, statistical analysis of service transactions for a service class is performed. The trends and/or patterns useful in differentiating among the services are determined. The trends and/or patterns are based on the service request, the location of the service and/or any other data and/or context feature useful in differentiating the services. In this way a service can be associated with a given time of day, a location and/or data, context or quality feature.

Figure 4:
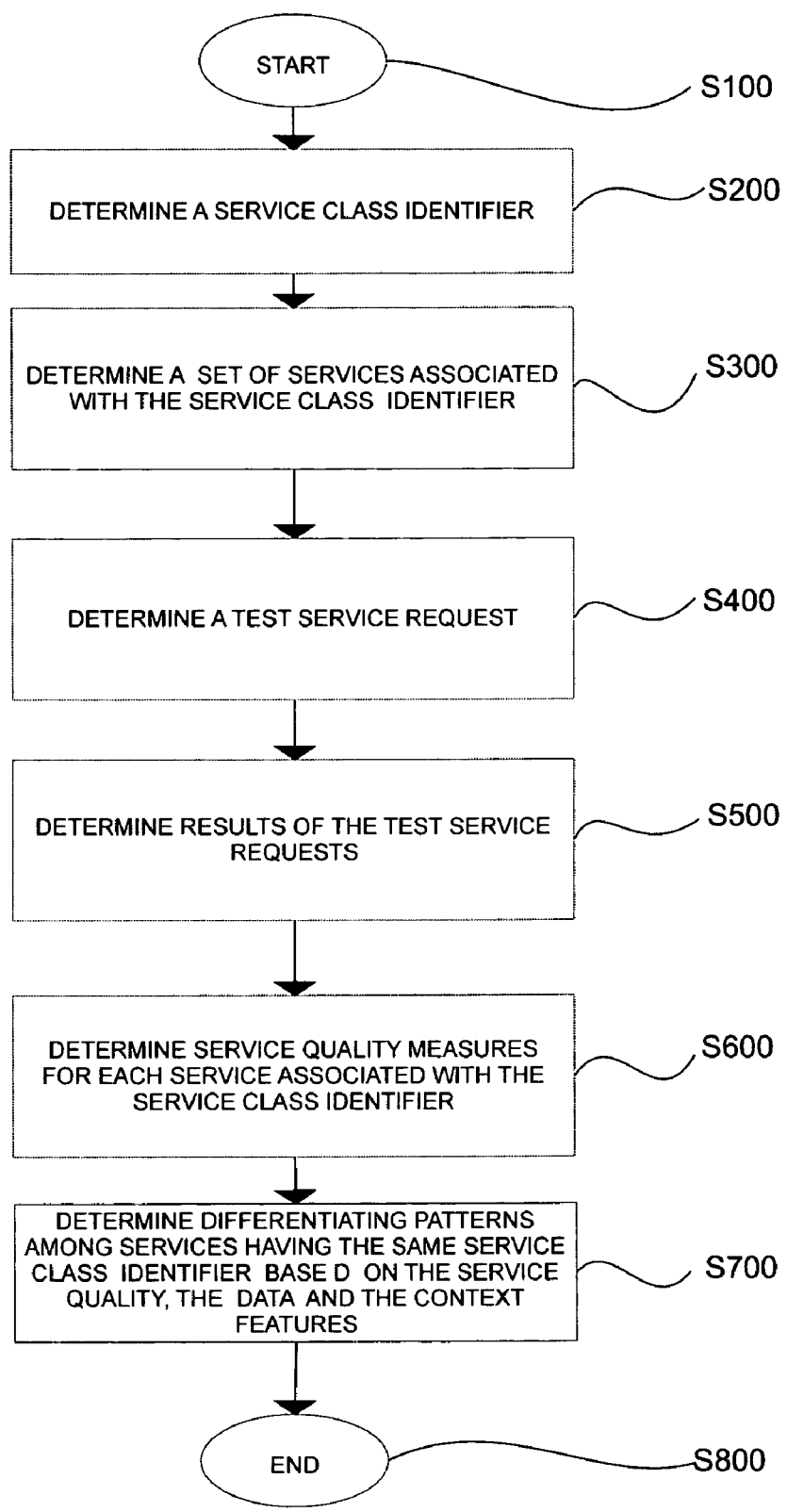
FIG. 4 is a flowchart of a first exemplary method of determining a service map according to this invention.

FIG. 4 is a flowchart of a first exemplary method of determining a service map according to this invention. The process begins at step S100 and immediately continues to step S200.

A service class is determined in step S200. The service class indicates the type of service to be performed. For example, English-French translation services that produce the same output are associated with the same service class identifier. Service requests for an English-French translation are satisfied by any of the services associated with the English-French translation service class. After the service class has been determined, control continues to step S300.

In step S300, the set of services associated with the service class identifier is determined. The set of services are functionally interchangeable or identical services. After the set of services has been determined, control continues to step S400.

A test service request is determined in step S400. In various exemplary embodiments, a verified result is associated with a test service request. The verified result can be determined by a human verifying the result, computer based verification or the like. After the test service request and optional verified result have been determined, control continues to step S500.

In step S500, the result of the test service request is determined. The result is determined by executing the service on the test document. After the result has been determined, control continues to step S600.

The service quality measure is determined in step S600. In one embodiment, the service quality measurement is a reflection of the similarity between the test result and a verified result. In other embodiments, the service quality measurement is based on feedback measures, objective or subjective evaluations and the like. After the service quality measurement has been determined, control continues to step S700.

In step S700, differentiating data feature patterns for each service are determined. The differentiating data feature patterns may be based on the data features, context features and/or service quality values. The differentiating data feature patterns are determined based on clustering, statistical analysis, and/or any other known or later developed type of machine learning. For example, in one embodiment, the differentiating data feature patterns are determined using traditional classification methods.

Thus, where a service request is to be associated with the best possible service in the service class, the service map is determined by analyzing the service transactions using Naïve Bayes, maximum entropy, Support Vector Machines (SVM), nearest neighbor clustering and the like. In a classifier training mode, a model is determined that associates a discriminative relationship between the transaction data features, context features, quality measures and the service identifiers. Different data feature patterns or models are learned for each service class found in the service map. As new service requests are received, a requested or desired quality is optionally added to the feature vector. A trained data feature pattern or model is chosen from the set of data feature patterns or models for each service class based on the received service request. The data feature pattern or model is used in conjunction with the data, context and quality features of the service request to determine the service identifier. The service request is then forwarded to the service associated with the service identifier. The result of the service is determined and a quality measurement for the result evaluated. The data features, context features and service quality measurements are used to update the service map.

In another exemplary embodiment, differentiating data feature patterns or models are determined by subdividing the range of possible quality measurements on a discrete scale. For example, the quality measurements are classified into poor, average and good quality values. The archived service requests from a service transaction repository are classified into three respective classes. Data feature patterns or models are determined for each distinct service class. The data feature patterns or models are trained using one or more discriminative learning classification algorithms. The data feature patterns or models encode the mapping between the input data features, the context features, the service identifiers and the quality class associated with each service request. Additional service requests are classified based on each of the N participating services in the system in the following way: (1) the data feature patterns or trained models and a discriminative learning classification algorithm are used to estimate across all services S:

(a) $i1=\text{argmax}(P(Q=\text{good}|\text{data\_features},\text{context\_features}, S_i))$ (b) $i2=\text{argmax}(P(Q=\text{average}|\text{data\_features},\text{context\_features}, S_i))$ (c) $i3=\text{argmax}(P(Q=\text{poor}|\text{data\_features},\text{context\_features}, S_i))$ (2) use any various criteria to determine which of i1, i2, or i3 is best to be used in the specific context. Where S is the set of services ranges from 1 to the maximum number of services N, the service quality measurement is Q, the data_features and context_features terms reflect the data and context features.

The possible criteria include an algorithmically determined probability of yielding the specific quality class, the cost factors associated with the service, an actual quality measurement for the class. For example, class i1 will be selected when the best quality desired. However, in some cases, the probability or confidence associated with the probability estimate is considerably lower than the one associated with i2. In this case, a safer average quality might be chosen over a riskier good one. It will be apparent that this step assumes importance when one decides to fragment the quality measurement into one or more classes. This facilitates compromises in quality and compromises in the risk of making incorrect decisions.

In various other embodiments, differentiating patterns are determined based on co-clustering methods. The service map is subdivided into groups or clusters of particularly similar entries based on the cosine distance between data and context feature vectors. Although a cosine distance method is described, it will be apparent that any known or later developed clustering method capable of clustering data and context feature representations can also be used. Each cluster is then associated with a representative quality measurement and a service identifier.

The data and context features and quality measurement of received service requests are compared against the clusters. The N clusters most similar to the service request are determined. The cluster with the highest quality is selected. The service request is forwarded to the service associated with cluster having the highest quality. This method converges to simpler versions when the value of N most similar cluster is one (N=1), or each cluster is made of only one element. In these cases, the quality/service identifier association of the clusters is trivial, because each record is associated with its own quality measure and service identifier.

The differentiating patterns and/or context, data and quality values associated with a service are stored in the service map. The data features of a service request are used as an index into the service map to select a service from the specified service class. After the differentiating patterns have been determined, control continues to step S800 and the process ends.

Figure 5:
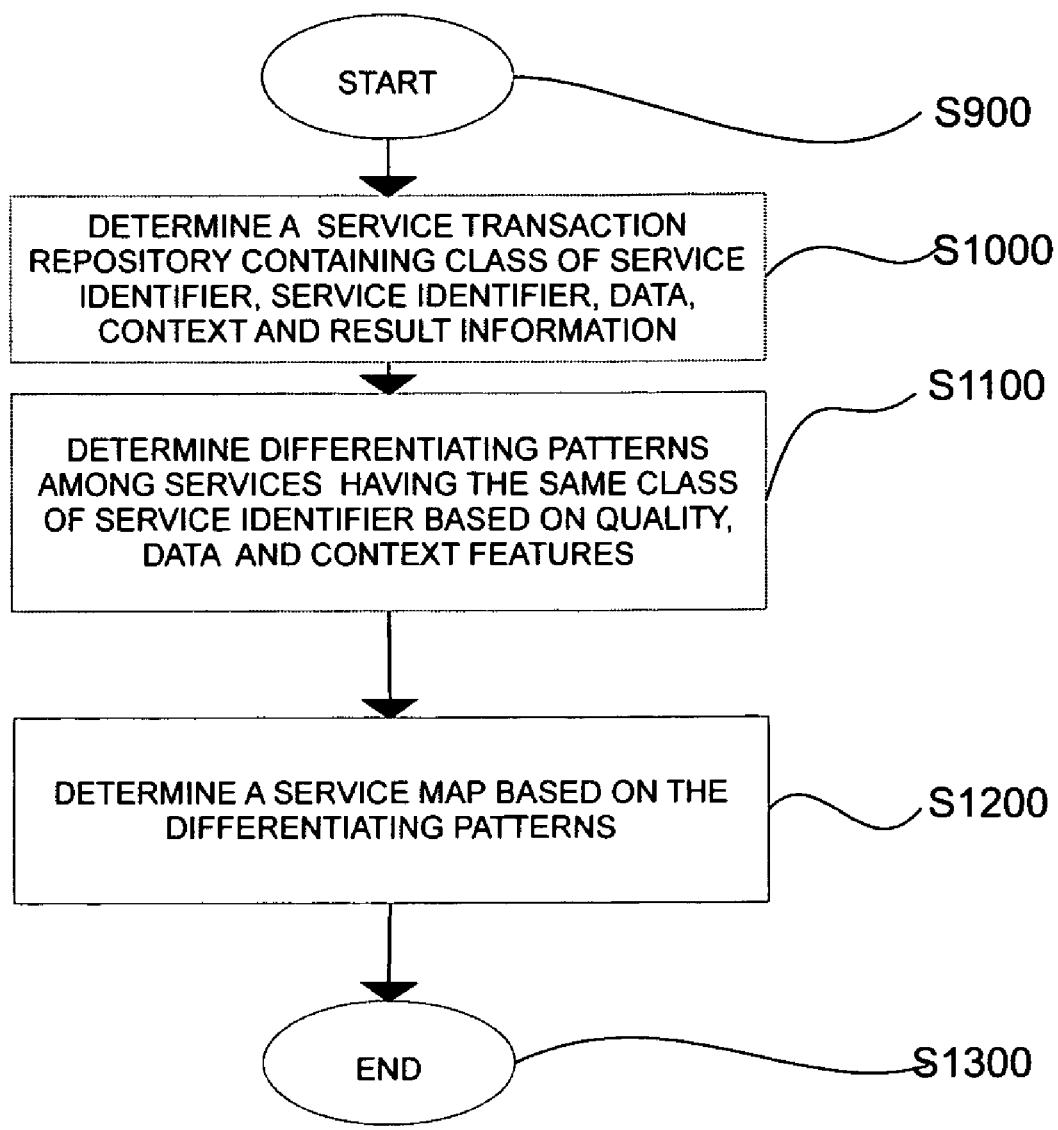
FIG. 5 is a flowchart of a second exemplary method of determining a service map according to this invention.

FIG. 5 is a flowchart of a second exemplary method of determining a service map according to this invention. The process begins at step S900 and immediately continues to step S1000. In step S1000, a service transaction repository is determined. The service transaction repository includes service, class of service identifiers, data features, context features, result information and optional quality measurements.

The service transaction repository may include transaction logs, archives and/or any other type of service transaction repository. After determining the service transaction repository, control continues to step S1100.

In step S1100, statistical analysis and/or machine learning is performed on the accumulated service transaction information. Service class groupings are identified and differentiating patterns associated with each service are determined. The differentiating patterns allow services within a service class to be selected based on data and context features. After the differentiating patterns have been determined, control continues to step S1200.

A service map is determined based on the service identifier, the service class identifier and the differentiating patterns in step S1200. The service map associates a service with the differentiating patterns capable of selecting a service. After the service map is determined, control continues to step S1300 and the process ends.

FIG. 6 is a first exemplary service transaction storage structure 1000 according to this invention. The service map storage structure 1000 is comprised of a service class identifier portion 1005; a service id portion 1010; a document portion 1015; a result portion 1020; a quality portion 1025 and a comment portion 1030.

The first row contains the value "X2HTML" in the service class identifier portion 1005. This value indicates the class of service to be performed. Each class of service reflects a group of one or more functionally identical services. That is, each service associated with the same service class accepts input and generates the same output. For example, services associated with the "X2HTML" service class accept documents for conversion to a hypertext markup language (HTML) document format. Thus, PDF to HTML, Word Doc to HTML, RTF to HTML and ASCII to HTML conversion services that generate output in HTML document format, are each associated with the "X2HTML" service class.

The service identifier portion 1010 contains the value "S1". This indicates a specific service associated with the "X2HTML" service class. The "S1" value uniquely identifies the service within the system for brokering services 100. For example, in one exemplary embodiment, the service identifier value is a Uniform Resource Locator, a link, an address and/or any other information useful in uniquely identifying services within the system.

The document portion 1015 contains the value "D1". This value reflects the name of the document or data file that is operated on by the selected service. The value in the document portion 1015 may be the actual file, a filename, a URL, a URI and/or any other known or later developed data source or data source identifier.

The result portion 1020 contains the value "R1". In one embodiment, the "R1" value reflects the name of the result file produced by the selected service. The value in the result portion 1020 may be a file containing a result, a URL, a URI identifying the location of the result file and/or any other result identifier.

The quality portion 1025 contains the value "–1". This value indicates a quality measurement associated with the result. In various embodiments, the quality measurement is comprised of one or more explicit or implicit feedback components, objective/subjective evaluation components and the like. For example, a "–1" value in the quality portion 1025 indicates that the service did not return a valid result.

It will be apparent that in various embodiments according to this invention failure analysis can be used to discover services. That is, value such as "–1" can be used to indicate a lack of support in a service for a subtype such as Word-HTML conversions. In contrast, positive service quality values indicate both the availability of the service and the quality of the result.

The optional comment portion 1030 contains the value "D1 IS A PDF, S1 RETURNS AN ERROR". This provides a comment describing the operations of the record.

The second row of the exemplary storage structure 1000 contains the values "X2HTML", "S2", "D1", "R2", and "150". The values in the second row reflect the operation of an "X2HTML" class of service performed by service "S2" on document "D1". The service "S2" produced a result "R2" with a service quality measurement of "150".

The third row of the exemplary storage structure 1000 contains the values "X2HTML", "S3", "D1", "R3", and "50". The values in the third row reflect an "X2HTML" class of service performed by service "S3" on document "D1". The service "S3" produced the result "R3" associated with a service quality measurement of "50".

The fourth row of the exemplary storage structure 1000 contains the values "X2HTML", "S4", "D1", "R4", and "100". The values in the fourth row reflect an "X2HTML" class of service performed by service "S4" on document "D1". The result "R4" has a service quality measurement of "100".

The fifth row of the exemplary storage structure 1000 contains the values "X2HTML", "S1", "D1", "R5", and "50". The values in the fifth row reflect an "X2HTML" class of service performed by service "S1" on document "D1". The result "R5" has a service quality measurement of "50".

The sixth row of the exemplary storage structure 1000 contains the values "X2HTML", "S2", "D2", "R6", and "–1". The values in the sixth row reflect the attempted performance of an "X2HTML" class of service by service "S2" on document "D2". The service "S2" produced the result "R6" associated with a service quality measurement of "–1". In various exemplary embodiments, the "–1" service quality measurement indicates an error condition returned by service "S2".

The seventh row of the exemplary storage structure 1000 contains the values "X2HTML", "S3", "D2", "R7", and "100". The values in the seventh row reflect the operation of an "X2HTML" class of service performed by service "S3" on document "D2". The service "S3" produced the result "R7" associated with a service quality measurement of "100".

The eighth row of the exemplary storage structure 1000 contains the values "X2HTML", "S4", "D2", "R8", and "75". The values in the eighth row reflect an "X2HTML" class of service performed by service "S4" on document "D2". The service "S4" produced the result "R8" which is associated with a service quality measurement of "75".

The ninth row of the exemplary storage structure 1000 contains the values "X2HTML", "S1", "D3", "R5", and "–1". The values in the ninth row reflect the attempted performance of an "X2HTML" class of service by service "S1" on document "D3". The service "S1" produced the result "R5" associated with a service quality measurement of "–1" indicating an error condition.

The tenth row of the exemplary storage structure 1000 contains the values "X2HTML", "S2", "D3", "R6", and "200". The values in the tenth row reflect the operation of an "X2HTML" class of service performed by service "S2" on document "D3". The service "S2" produced the result "R6" associated with a service quality measurement of "200".

The eleventh row of the exemplary storage structure 1000 contains the values "X2HTML", "S3", "D3", "R7", and "10". The values in the eleventh row reflect an "X2HTML" class of service performed by service "S3" on document "D3". The service "S3" produced the result "R7" associated with a service quality measurement of "10".

The twelfth row of the exemplary storage structure 1000 contains the values "X2HTML", "S4", "D3", "R8", and "75". The values in the twelfth row reflect the operation of an "X2HTML" class of service performed by service "S4" on document "D3". The service "S4" produced the result "R8" associated with a service quality measurement of "75".

The last row of the exemplary storage structure 1000 contains the values "X2HTML", "S98", "D99", "R998", and "75". The values in the last row reflect an "X2HTML" class of service performed by service "S98" on document "D99". The service "S98" produced the result "R998" associated with a service quality measurement of "75".

The first 5 rows of the exemplary service transaction storage structure 1000 reflect the results "R1-R5", of performing services "S1-S5", within the "X2HTML" class of service. Each service transaction reflects a service performed on the PDF document "D1". The values in the quality portion 1025 for each service transaction are used to select a service for the data, context and/or quality features of a given document. Rows 6-8 of the exemplary service transaction storage structure 1000 reflect the performance of services S2-S4 on Word document "D2". The values in the quality portion 1025 are used to select a specific X2HTML class of service to convert the Word document "D2" to an HTML format.

Rows 9-12 of the exemplary service transaction storage structure 1000 reflect services on PDF document "D3". The values in the service quality portion 1025 are used to select a specific service to perform the PDF to HTML document conversion. Although one of the exemplary embodiments shows the selection of a service in a class may be based on the data features and the quality measurements, it will be apparent that data features, context features and/or quality measurements can be used alone or in combination to form differentiating patterns for a service.

The last row of the exemplary service transaction storage structure 1000 reflects a service "S98" associated with a "X2WORD" class of service. The service is performed on document "D99" to produce the result "D998" with a service quality "75".

Figure 7:
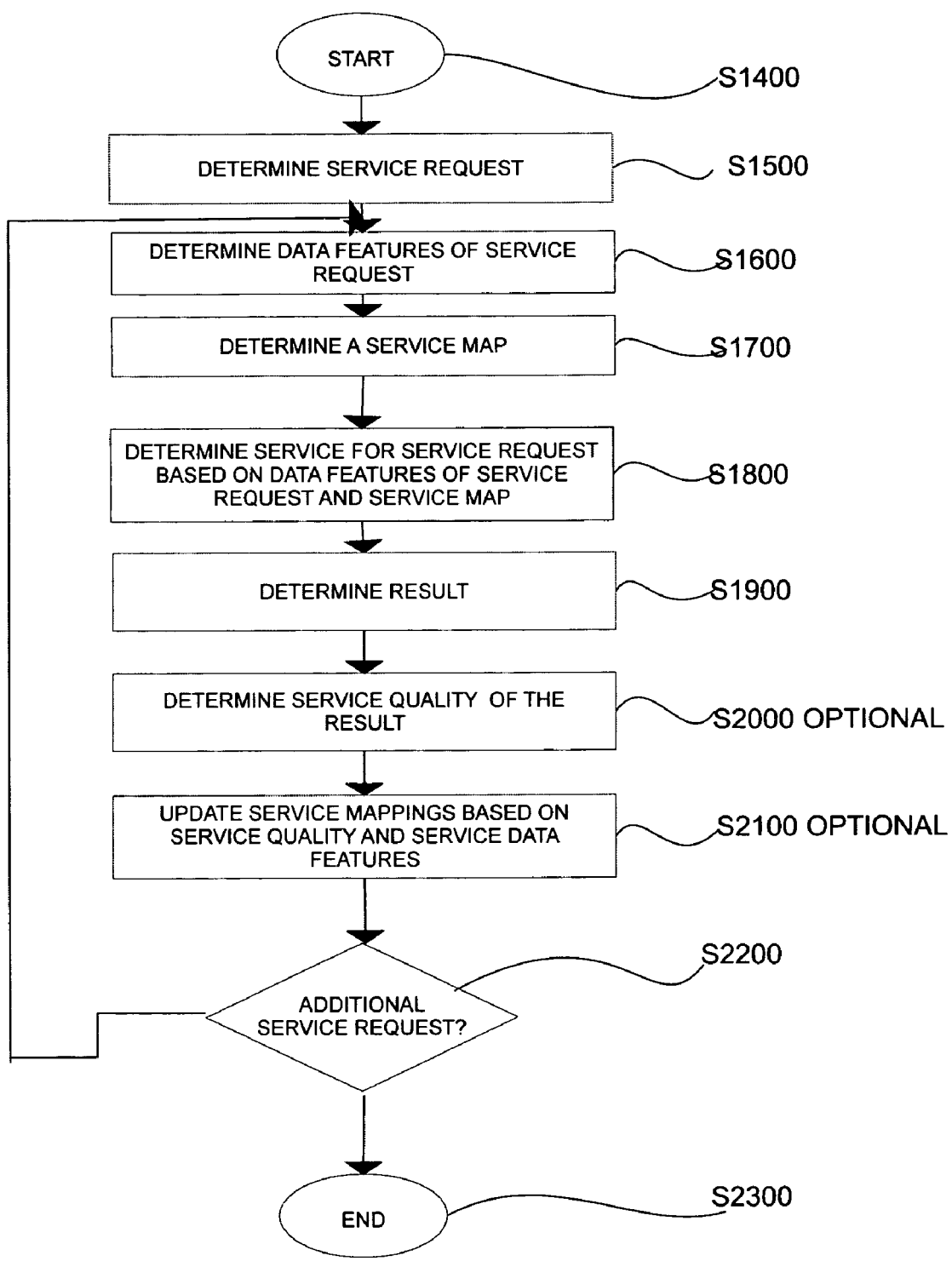
FIG. 7 is an exemplary method for brokering services according to this invention.

FIG. 7 is an exemplary method for brokering services according to this invention. The process begins at step S1400 and immediately continues to step S1500 where a service request is determined.

The service request indicates the class of service to be performed by a selected service. The service request includes, but is not limited to service requests that: translate between languages; convert file formats; convert media; transfer; synthesize and/or otherwise transform information. For example, in one embodiment, a service request retrieves quotes for a stock portfolio; retrieves personalized news; and retrieves personalized shopping information and the like. Moreover, a service request may be recursively separated into component service requests without departing from the scope of this invention. After the service request has been determined, control continues to step S1600.

In step S1600, the data and context features of the service request are determined. The data features include, but are not limited to features describing the request, the requestor and the desired result. The context features may include, but are not limited to, time of day, service load information and the like. For example, in one embodiment, the data features of the service request may describe the language of the document to be processed, the number of words in the document, the genre of the document and/or any known or later identified feature of the data useful in differentiating among services within a class. Similarly, the context features include a time of day value allowing lightly loaded services to be identified. After the data features of the service request have been determined, control continues to step S1700 where the service map is determined.

The service map routes service requests to services based on differentiating patterns in the data and/or context features. In various exemplary embodiments, the associations are based on machine learning, statistical analysis, service quality feedback and the like.

For example, in one exemplary embodiment according to this invention, a request for an English-French translation of a text file "D3MLKUSA" with a readability value of at least "0.95" and a domain of "SALES" is forwarded to service "S92". The service "S92" is chosen over other services in the English-French translation class of service based on the degree of similarity between the data and context feature representations of service "S92" and the data and context feature representations of the service request. In contrast, if the word length features of the service request were downweighted, then a service provider "S95" is selected as the service provider with the most similar data and context feature representations.

The determined service map reflects associations between exemplary data and context feature representations or data and context feature vectors and services capable of providing the requested class of service. For example, in one embodiment, each service in the class of English-French translation services is associated with data feature patters that include the data and context feature representations describing the genre of previously translated documents, the average number of words and sentences in the previously translated documents and/or any other known or later determined data feature useful in differentiating among the services. In various other embodiments, context features such as time of day, service load and the like are also included. The data features and context features of the service request are used in conjunction with the service map to select a service from the services in the requested class of service.

In various exemplary embodiments according to this invention, the data feature patterns in the service map are learned from the data features and/or context features of exemplary documents associated with each service. The service map is optionally updated as new services are added. Dynamic updates of the service map allow new services, new data features and/or new context feature associations to be incorporated into the service map as they become available. After the service map has been determined, control continues to step S1800.

In step S1800, a service is determined based on the data and/or the context features of the service request and the service map. For example, in one exemplary embodiment, a service request for an English-to-French translation of a document is associated with data and/or context features that describe the document and the request. The service request data features indicate the document is a technical document with a file size of 1200K at 17:00 hr GMT. The data features of the service request are used to select a service from the services in the English-French translation service class able to handle technical documents of file size 1200K. After the service is determined based on the service map, control continues to step S1900.

The result of the service request is determined in step S1900. The result of a service request is a multimedia file, a streaming audio or video file, new information or the like. After the result of the service request has been determined, control continues to optional step S2000.

In optional step S2000, the service quality of the result is optionally determined. The service quality includes objective and subjective measures of service quality. Thus, in one of the various exemplary embodiments, feedback information from a requestor is used to create a service quality measurement. Service quality measurements can also be determined by comparing the service request result to a known gold-standard or known test result. Any deviations from the gold standard or known test result are determined. In one exemplary embodiment, services with fewer deviations from the known gold-standard are assigned higher service quality values. After the service quality of the test result has been determined, control continues to optional step S2100.

In optional step S2100, the service map is updated based on the service quality and the data features of the service. Thus, services from a service with a low service quality value are typically associated with a reduced likelihood of selection unless mitigated by some other factor. In contrast, services with a high service quality measurement are associated with an increased likelihood of selection. After the service map has been updated, control continues to step S2200.

In step S2200, a determination is made as to whether there are additional service requests to be processed. If it is determined that there are additional service requests to be processed, control continues to step S1600. Steps S1600-S2200 are then repeated until no additional service requests remain or the session is terminated. When the session is terminated or no additional service requests remain, control continues to step S2300 and the process ends.

Figure 8:
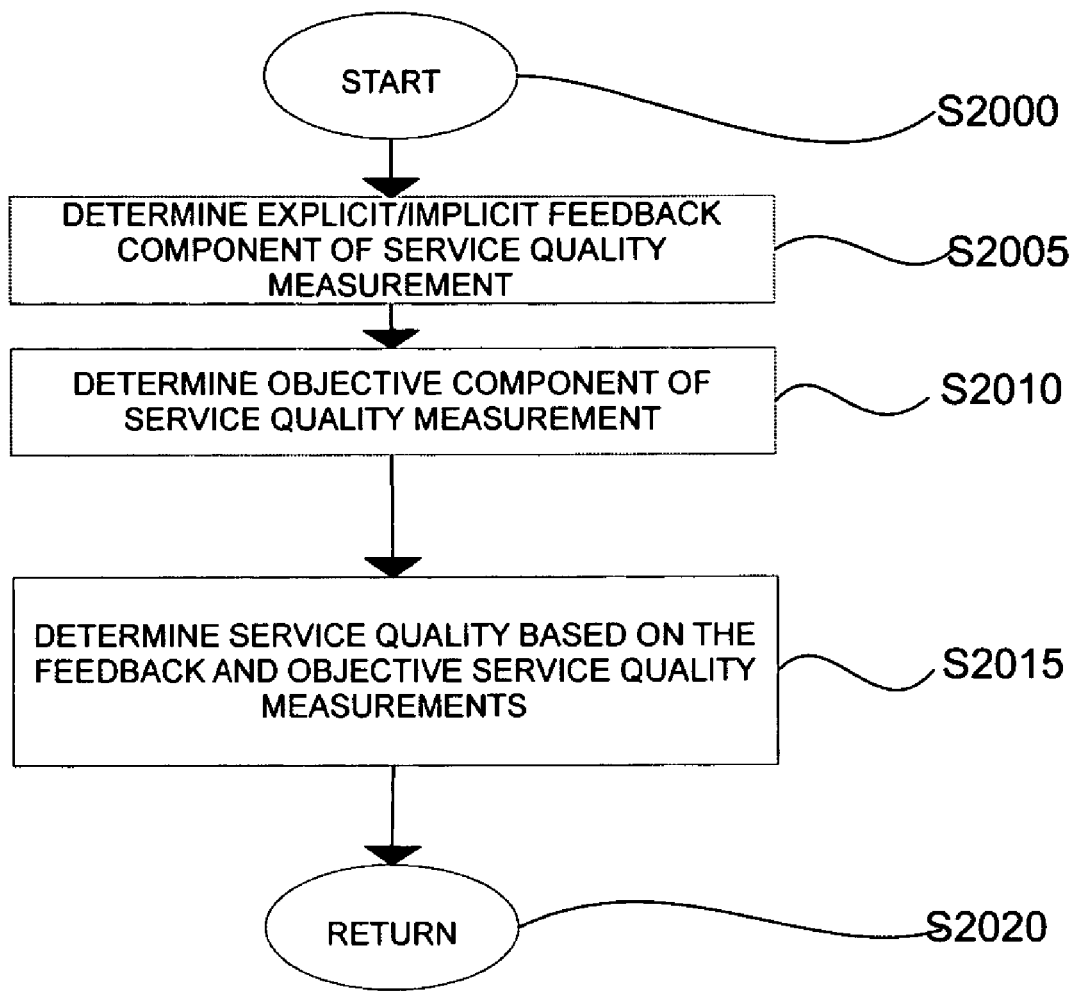
FIG. 8 shows a first exemplary method for determining service quality according to this invention.

FIG. 8 is a first exemplary method for determining service quality according to this invention. The process begins at step S2000 and immediately continues to step S2005. In step S2005, a feedback service quality measurement is determined. In various embodiments, the feedback service quality measurement is based on explicit and/or implicit measurements of the user, a verified service and/or third party indicators of confidence in the returned result. The explicit indications include, but are not limited to, survey responses, information in trouble ticket databases and the like. Implicit service quality indications include, but are not limited to, the frequency of use associated with a service provider and the like. The explicit and/or implicit feedback service quality measurements are useable alone or in combination without departing from the scope of this invention. Control then continues to step S2010.

In step S2010, an objective service quality measurement is determined. In various exemplary embodiments, objective service quality measurements are based on comparisons of results obtained from one or more service providers. The results are compared to a known test result or gold standard result from a user, service provider and/or third party known. Deviations from the known test result or gold standard are identified and used to provide an objective service quality measurement. For example, in one exemplary embodiment, a human verified English-French translation document is used as the test or gold standard test result. The English document is submitted to one or more services in an English-French class of translation services. The results from each service are compared to the known test result or gold standard test result. Differences are identified and used to determine objective service quality measurements for the selected services. In various exemplary embodiments, the feedback service quality measurement and the objective service quality measurement are combined into a single service quality measurement. After the objective service quality measurement has been determined, control continues to step S2015.

A service quality measurement for the service is determined based on the determined feedback and the objective service quality measurements in step S2015. Thus, each service offered by a service provider is associated with a service quality measurement. After the service quality measurement for the service has been determined, control continues to step S2020 and the process returns. Control then continues to step S2100 of FIG. 7.

Figure 9:
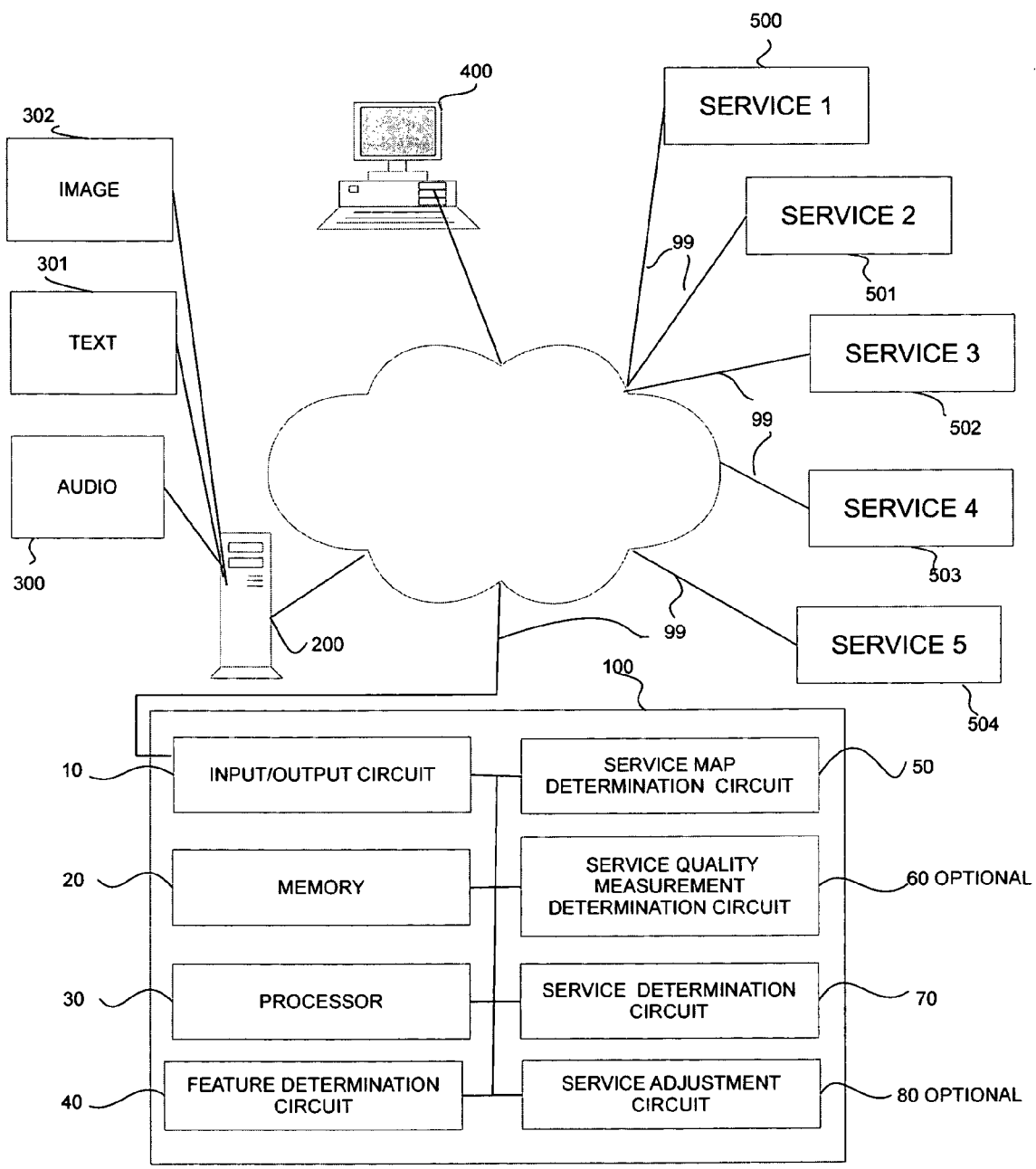
FIG. 9 is an exemplary system for brokering services according to this invention.

FIG. 9 is an exemplary system for brokering services 100 according to this invention. The system for brokering services 100 is comprised of: a memory 20; a processor 30; a feature determination circuit 40; a service map determination circuit 50; an optional service quality measurement determination circuit 60; a service determination circuit 70; and an optional service quality adjustment circuit 80; each connected via input/output circuit 10 to services 1-5, 500-504; to communications enabled personal computer 400, and an information repository 200 providing access to documents 300-302.

The user of communications-enabled personal computer 400 initiates a service request for the transformation of a text document 301 to an audio format. The service request is forwarded to the system for brokering services. The processor 30 of the system for brokering services 100 retrieves the text document 300 over communications link 99. The processor determines the data and context features for the service request by activating the feature determination circuit or routine 40. The data features may include, but are not limited to, language, genre, style, format, size, and/or any known or later developed feature useful in differentiating among services in a service class.

The context features may include, time of day, location of service, and/or any other known or later developed feature useful in differentiating among the services of a given service class. The processor 30 activates the service map determination circuit 50 to determine the service map. The service map associates services with differentiating patterns. The differentiating patterns provide for selecting a service within a service class. The service determination circuit 70 is activated to identify a text-audio conversion service based on the data and context patterns of the service request and the differentiating patterns contained within the service map.

The optional service quality measurement determination circuit 60 is activated to determine one or more quality measurements for the result. The service quality measurements include, but are not limited to, implicit and/or explicit feedback indicators, objective/subjective evaluations or the like. The service quality measurements indicate how well the service was performed or how well a user is satisfied with the result. For example, in one embodiment according to this invention, automatic speech recognition is applied to the audio result document. The recognized speech is then compared to the text document 300 and differences identified as possible errors.

The processor 30 activates the optional service adjustment circuit 80 to adjust the service map based on the service quality measurements. In various exemplary embodiments according to this invention, the adjustments to the service map are used to add new services, delete old services, revise differentiating patterns and/or update quality metrics associated with the services. Thus, a new service is easily added. The converted audio result document is then returned to the user of communications-enabled personal computer 400.

FIG. 10 is a first exemplary service map 1100 according to this invention. The second service map 1100 is comprised of a service class identifier portion 1110; a service identifier portion 1120; a data features portion 1130; and a quality portion 1140.

The first row of the first exemplary service map 1100 contains the value "2BQ73" in the service identifier portion 1110. The value "2BQ73" indicates the type of service. For example, in one exemplary embodiment according to this invention, the value "2BQ73" is associated with the class of English-French translation services. One or more services are associated with each class of service.

The service id portion 1120 contains the value "S3". This value uniquely identifies the service to the system for brokering services. The data features portion 1130 contains the value "A1B1C2D5E6F0.95". This value indicates an exemplary data feature representation or data feature vector associated with the service "S3". In various embodiments, context features are included in a context feature representation or in combination with the data feature representation. The quality portion 1140 contains the value "0.90". This indicates how well the service performed. In various embodiments, the quality measurement is based on explicit, implicit, subjective, objective and or any other type of feedback. The value in the quality portion 1140 is used to indicate how well the service performs based on a specific metric, the specific data features and the context of the service request.

The second row of the exemplary service map 1100 contains the value "2BQ73" in the service class id portion 1110. This indicates that the service is associated with the class of English-French translation services. The service id portion 1120 contains the value "S6". The value "S6" uniquely identifies the service to the system for brokering services. The data features portion 1130 contains the value "A7B6C4D2E3F0.75". This value indicates an exemplary data feature representation or data feature vector comprising data features associated with the "S6" service. In one embodiment according to this invention, service requests are routed to services based on the similarity between the data features of the service request and the data features stored in the data features portion 1130. In various other embodiments, the context features are also included. The exemplary data feature representation or data feature vector includes the average size of the file, the language of the data and/or various other data features useful in differentiating among services in a class. The service quality portion 1140 contains the value "0.95" indicating the quality of the service.

The third row of the exemplary service map 1100 contains the value "2BQ73" in the service class id portion 1110. This indicates that the service is associated with the class of English-French translation services. The service id portion 1120 contains the value "S7" which uniquely identifies the service to the system for brokering services. The data features portion 1130 contains "A1B1C2D5E5F0.80". This value indicates the data features associated with the "S7" service. Service requests are routed to services based on the similarity between the data features of the service request and the data features stored in the data features portion 1130. The exemplary data feature representation or data feature vector includes the average size of the file, the language of the data and/or various other differentiating patterns among services in a class. The quality portion 1140 contains the value "0.90" indicating the quality of the service.

The last row of the exemplary service map 1100 contains the value "B55C4" in the service class id portion 1110. The value "B55C4" is associated with services that summarize documents.

The provider id portion 1120 contains the value "S4". This value uniquely identifies the service. The data features portion 1130 contains the value "A2C5D6E7F0.89". This value reflects an exemplary data feature representation or data feature vector for the service. In one of the various exemplary embodiments, the exemplary data feature representation or data feature vector associated with the service reflects the prior transactions associated with the service. The quality portion 1140 contains the value "0.80". This indicates the service quality of the result.

In various exemplary embodiments, the Euclidean distance between an exemplary data feature vector of a service provider and the data feature vector of a service request is used to differentiate among functionally identical services. However, it should be apparent that various other measures of similarity between exemplary data feature representations and the data features of service requests can be used without departing from the scope of this invention.

FIG. 11 is a second exemplary service transaction storage structure 1300 according to this invention. The second service transaction storage structure is comprised of a transaction identifier portion 1305; a service class identifier portion 1310; a service identifier portion 1315; a requestor identifier portion 1320; a document type portion 1325; a word length portion 1330; a sentence length portion 1335; a readability portion 1340; a language portion 1345; a domain portion 1350; a document portion 1355; a result portion 1360; and a quality portion 1365.

The first row of the second exemplary service transaction storage structure 1300 contains the value "1" in the transaction identifier portion 1305. The value "1" uniquely identifies the transaction within the service transaction storage structure. Transaction identifiers may include numbers, alphanumeric sequences or any information useful in uniquely identifying the specific transaction.

The service id portion 1310 contains the value "9EB73". This value indicates the transaction is an English-French translation class of service. Multiple services may provide the same class of service. The service identifier portion 1315 contains the value "S1". This value uniquely identifies the service. Values in the service identifier portion 1315 allow the performance of a service to be selected and compared with other services offering the same class of service. The selection and ordering operations facilitate the identification of trends and patterns.

The requestor id portion 1320 contains the value "34A76T". This value indicates the identity of the requestor initiating the service request. The value in the requestor identifier portion 1320 is used to identify customer preferences based on historical trends and/or other differentiating patterns in the transaction information.

The document type portion 1325 contains a "TEXT" value useful in classifying, segregating and/or clustering transactions based on the type of document or file to be processed. For example, audio, video and text files are identified and grouped to identify differentiating patterns affecting the relevant type of document. New data features may be added to incorporate additional features affecting the service. New service requests that match the added data features are directed to the appropriate service based on the new data features. For example, the value "TEXT" in the document type portion 1325 indicates that the source document is a text document. Analysis of the data feature patterns is performed to determine differentiating patterns. The differentiating patterns are used to indicate services which perform better on particular types of text documents. It will be apparent that the document type portion may indicate text, audio, video, image and/or any known or later developed type of document without departing from the scope of this invention.

The word length portion 1330 contains the value "5". This value indicates the average length of words in the document. Information about the average word length facilitates identification of service providers best able to handle the document.

The sentence length portion 1335 contains the value "5". The value reflects the average length of sentences in the document. The average sentence length information is useful in clustering transactions and identifying differentiating patterns and/or trends affected by the sentence length.

The readability portion 1340 contains the value "0.95". This indicates the readability of the document. In various exemplary embodiments according to this invention, the readability measurement is a Kincaid readability index score. However, it will be apparent that any known or later developed readability measurement may be used without departing from the scope of this invention.

The language portion 1345 contains the value "ENGLISH". This indicates the language of the document operated on by the service. The domain portion 1350 contains the value "SALES". The "SALES" value indicates the document is in the sales domain. The document portion 1355 contains the value "D3MLKUSA". This indicates the name of the document operated on by the service. In various other embodiments, the value is a filename, a URL, a URI and/or any other reference to the document.

The result portion 1360 contains the value "RFR564FF1". This value indicates the name of the file containing the result. The quality portion 1365 contains the value "0.95" indicating the quality of the result.

The second row of the second exemplary service transaction storage structure 1300 contain the values "2", "9EB73", "S1", "34A76T", "TEXT", "5", "5", "0.60", "ENGLISH", "SALES", "DFG54SSSS", "RFREDCFS", "0.60". These values indicate that the first identified service transaction is associated with a "9EB73" class of service performed by service "S1" and requested by requestor "34A76T". The source document is of type "TEXT" and contains words of average length "5" and sentences of average length "5". The document is associated with a readability index of "0.60", is written in "ENGLISH" and associated with a "SALES" domain. The source document is "DFG54SSSS" and the result filename is "RFREDCFS". The result is associated with a service quality measurement of "0.60".

The third row of the second exemplary service transaction storage structure 1300 contain the values "3", "9EB73", "S1", "34A76T", "TEXT", "5", "8", "0.75", "ENGLISH", "TECHNICAL", "D4321SDFR", "RFR432S4", "0.81". These values indicate that the first identified service transaction is associated with a "9EB73" class of service performed by service "S1" and requested by requestor "34A76T". The document operated upon was of type "TEXT" and contained words of average lengthy "5" and sentences of average length "8". The document is associated with a readability index of "0.75", is written in "ENGLISH" and associated with a "TECHNICAL" domain. The source document is "D4321SDFR" and the result filename is "RFR432S4". The result is associated with a service quality measurement of "0.81".

The fourth row of the second exemplary service transaction storage structure 1300 contain the values "4", "9EB73", "S1", "34AZ6T", "TEXT", "5", "8", "0.60", "ENGLISH", "SALES", "D45678VSM", "RFRDE432", "0.95". These values indicate that the first identified service transaction is associated with a "9EB73" class of service performed by service "S1" and requested by requestor "34AZ6T". The document operated upon was of type "TEXT" and contained words of average lengthy "5" and sentences of average length "8". The document is associated with a readability index of "0.60", is written in "ENGLISH" and associated with a "SALES" domain. The source document is "D45678VSM" and the result filename is "RFRDE432". The result is associated with a service quality measurement of "0.95".

The last row of the second exemplary service transaction storage structure 1300 contain the values "N", "B55C4", "S4", "J73FJK", "TEXT", "3", "5", "0.89", "ENGLISH", "SALES", "D4BMZSWD", "R4567GTR", "0.87". These values indicate that the first identified service transaction is associated with a "B55C4" class of service performed by service "S4" and requested by requestor "J73FJK". The document operated upon was of type "TEXT" and contained words of average lengthy "3" and sentences of average length "5". The document is associated with a readability index of "0.89", is written in "ENGLISH" and associated with a "SALES" domain. The source document is "D4BMZSWD" and the result filename is "R4567GTR". The result is associated with a service quality measurement of "0.87".

FIG. 12 is a third exemplary service transaction storage structure 1400 according to this invention. The third service transaction storage structure 1400 is comprised of: a transaction identifier portion 1405; a service class identifier portion 1410; a service identifier portion 1415; a requestor id portion 1420; a document type portion 1425; a bitrate portion 1430; format portion 1435; an amplitude portion 1440; an energy portion 1445; a document portion 1450; a result portion 1455; and a quality portion 1460.

The first row of the third exemplary service transaction storage structure 1400 contains the values "1", "TVB73", "S2", "34A76T", "AUDIO", "30K", "MP-3", "0.90", "0.95", "D45FG54S", "RRED53S", and "0.80". These values indicate the service request identified by transaction identifier value "1" is a request for service type "TVB73", provided by service "S2" to requestor "34A76T". The service request operates on an "AUDIO" document associated with a 30K bitrate in an MP-3 format having amplitude of "0.90" and energy of "0.95". The document is stored in file "D45F6545" and the result is stored in file "RRED535". The quality of the service is given a value of "0.80".

The last row of the third exemplary service transaction storage structure 1400 contain the values "N", "Q85C4", "S5", "J73FJK", "AUDIO", "60K", "MP-4", "0.82", "0.89", "D432SWS", "RGFR43", "0.91". This indicates that the service transaction is associated with a "Q85C4" class of service performed by service "S5" and requested by requestor "J73FJK". The document is of type "AUDIO" encoded with a "60K" bitrate in the "MP-4" format having average amplitude of "0.82" and average energy of "0.89". The source document is "D432SWS" and the result filename is "RGFR43". The result is associated with a service quality measurement of "0.91".

FIG. 13 is a fourth exemplary service transaction storage structure 1500 according to this invention. The fourth service transaction storage structure 1500 is comprised of a transaction identifier portion 1505; a service class identifier portion 1510; a service identifier portion 1515; a requestor identifier portion 1520; a document type portion 1525; a frame-rate portion 1530; a size portion 1535; a colors portion 1540; an energy portion 1545; a shot length portion 1550; a contains people portion 1555; a document portion 1560; a result portion 1565 and a quality portion 1570.

The first row of the fourth exemplary transaction storage structure 1500 contains the values "1", "2QB73", "S3", "34A76T", "VIDEO", "6", "95K", "116M", "0.95", "2", "Y", "D31SEDXA", "RCHYT", "0.95". These values indicate the service request identified by the transaction identifier value "1" is a request for a service in service class "2QB73", provided by service provider "S3" to requestor "34A76T". The service request operated on a "VIDEO" type document of size 95K associated with a frame-rate of 6, 16 million colors, energy of "0.95", shot length of 2 seconds and which contains people in the video. The document name is "D31SEDXA", the result name is "RCHYT" and the requested service quality is "0.95".

The last row of the fourth exemplary transaction storage structure 1500 contains the values "N", "LP5C4", "S8", "J73FJK", "VIDEO", "6", "100M", "16M", "0.89", "2", "Y", "D56MNRFFF", "RJHYTG", "0.82". These values indicate the service request identified by the transaction identifier value "N" is a request for a service in service class "LP5C4", provided by service provider "S8" to requestor "J73FJK". The service request operated on a "VIDEO" type document of size 100M associated with a frame-rate of 6, 16 million colors, energy of "0.89", shot length of 2 seconds and which contains people in the video. The document name is "D56MNRFFF", the result name is "RJHYTG" and the quality is "0.82".

FIG. 14 is a fifth exemplary service transaction storage structure 1600 according to this invention. The fifth exemplary service transaction storage structure 1600 is comprised of a transaction identifier portion 1605; a service class identifier portion 1610; a service identifier portion 1615; a requestor id portion 1620; a document type portion 1625; a size portion 1630; a format portion 1635; a people/faces portion 1640; a photo/drawing portion 1645; an exterior/interior portion 1650; a colors portion 1655; an average energy portion 1660; a document portion 1665; a result portion 1670; and a quality portion 1675.

The first row of the fifth exemplary service transaction storage structure 1600 contains the values "1", "5VB73", "S9", "34A76T", "IMAGE", "1M", "JPEG", "P", "P", "E", "16M", "0.95", "D45GFR4", "RADE45", "0.81". These values indicate the service request identified by the transaction identifier value "1" is a request for service type "5VB73", provided by service provider "S9" to requestor "34A76T". The service request operates on an "IMAGE" type document associated with a JPEG formatted image containing people in the photo image. The image is an exterior image with 16 million colors and an energy level of "0.95". The document is stored in "D45GFR4" and the result in "RADE45" associated with a quality measurement of "0.81".

The last row of the fifth exemplary service transaction storage structure 1600 contains the values "N", "L15C4", "S12", "J73FJK", "IMAGE", "103K", "PNG", "P", "P", "I", "64K", "0.99", "D789JHT", "R65GT5", "0.99". These values indicate the service request identified by the transaction identifier value "N" is a request for service type "L14C4", provided by service provider "S12" to requestor "J73FJK". The service request operated on an "IMAGE" type document associated with PNG formatted images containing people. The image is an interior image with 64 thousand colors and an energy level of 0.99. The document is stored in "D789JHT" and the result in "R65GT5" associated with a quality measurement of "0.99".

In the various embodiments of the system for brokering services 100, each of the circuits 10-80 outlined above can be implemented as portions of a suitably programmed general-purpose computer. Alternatively, 10-80 of the system for brokering services 100 outlined above can be implemented as physically distinct hardware circuits within an ASIC, or using a FPGA, a PDL, a PLA or a PAL, or using discrete logic elements or discrete circuit elements. The particular form each of the circuits 10-80 of the system for brokering services 100 outlined above will take is a design choice and will be obvious and predictable to those skilled in the art.

Moreover, the system for brokering services 100 and/or each of the various circuits discussed above can each be implemented as software routines, managers or objects executing on a programmed general purpose computer, a special purpose computer, a microprocessor or the like. In this case, system for brokering services 100 and/or each of the various circuits discussed above can each be implemented as one or more routines embedded in the communications network, as a resource residing on a server, or the like. The system for brokering services 100 and the various circuits discussed above can also be implemented by physically incorporating the system for brokering services 100 into software and/or hardware system, such as the hardware and software systems of a web server or a client device.

As shown in FIG. 9, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 9 can each be any known or later developed device or system for connecting a communication device to the system for brokering services 100, including a direct cable connection, a connection over a wide area network or a local area network, a connection over an intranet, a connection over the Internet, a connection within a computer over an internal bus, and/or a connection over any distributed processing network or system. In general, the communication links 99 can be any known or later developed connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for creating a service map comprising:
   using a processor to mine a service transaction repository containing information regarding service transactions of functionally identical services, the functionally identical services belonging to a same class of services, each service associated with at least one data feature pattern;
   determining data feature patterns of the services of the same class in the service transaction repository; and determining a service map associating the services with the data feature patterns, wherein the data feature patterns correspond to data features of service requests directed to the services, wherein the data feature patterns differentiate between the services in the same class of services, wherein the data feature patterns are vectors having components comprising average file size, data language, and data features useful in differentiating among services in a class, and wherein the services in the class transform a first document from a first form into a second form, and the data feature patterns include features selected from a group consisting of document language, document genre, number of words in the document, type of words in the document, document domain, document readability, and sentence length in the document.

2. The method of claim 1, in which the service maps include service provider information.

3. The method of claim 1, wherein the data feature patterns are determined based on at least one of: machine learning and statistical analysis.

4. The method of claim 1, in which the service transactions are at least one of: a web service; a remote procedure call and a remote method invocation.

5. The method of claim 1, the data features include information about at least one of: a requestor, past usage and service quality.

6. The method of claim 5, in which the service quality information is at least one of: feedback information and objectively evaluated information.

7. The method of claim 6, wherein the feedback information is at least one of implied and explicit information.

8. A system for creating a service map comprising:

a processor that determines a set of at least two functionally identical service transactions, each service transaction associated with a data feature pattern;

mines data feature patterns in the service transaction repository;

determines a service map associating functionally identical services with the determined data feature patterns, the data feature patterns differentiating between the functionally identical services, wherein the data feature patterns correspond to data features of service requests directed to the functionally identical services, wherein the functionally identical services transform a first document from a first form into a second form, and the data feature patterns include features selected from a group consisting of document language, document genre, number of words in the document, type of words in the document, document domain, document readability, and sentence length in the document, and wherein the functionally identical services are services having a same type of functionality and belonging to a same class of services.

9. The system of claim 8, wherein the data feature patterns are determined based on at least one of: machine learning and statistical analysis.

10. The system of claim 8, in which the service transactions are at least one of: a web service; a remote procedure call; a remote method invocation.

11. The system of claim 8, in which the data features include information about at least one of: a requester, past usage and service quality information.

12. The system of claim 11, in which the service quality information is at least one of: feedback information and objectively evaluated information.

13. The system of claim 12, wherein the feedback information is at least one of: implied and explicit information.

14. Computer readable storage medium comprising:

computer readable program code embodied on the computer readable storage medium, the computer readable program code usable to program a computer for creating a service map comprising:

mining a service transaction repository of at least two functionally identical service transactions performed by functionally identical services, the functionally identical services belonging to a same class of services, each transaction associated with data feature patterns;

determining the data feature patterns associated with each service in the service transaction repository; and determining the service map associating services with the identified data feature patterns, wherein the data feature patterns correspond to data features of service requests directed to the services, wherein the data feature patterns differentiate between the services in the same class of services, and wherein the services in the class transform a first document from a first form into a second form, and the data feature patterns include features selected from a group consisting of document language, document genre, number of words in the document, type of words in the document, document domain, document readability, and sentence length in the document.

15. A method for selecting a service from among a class of web services, each class being a group of web services providing functionally identical services, the method comprising:

mining a service transactions repository containing prior service transactions for services in a first class;

determining a service data feature pattern associated with each of the services in the first class;

developing a service map for the services in the first class, the service map establishing a correspondence between each of the services and the service data feature pattern associated with each of the services;

receiving a service request for services of the first class;

determining request data features associated with the service request;

matching the request data features against the service data feature pattern of the services in the first class to identify a first service; and routing the service request to the first service, wherein the service data feature pattern associated with the first service differentiates between the first service and other services in the first class, and wherein the functionally identical services are services having a same type of functionality and belonging to a same class of services.

16. The method of claim 15, further comprising:

initializing the service map to a null state; and dynamically updating the service map responsive to performance of the first service in response to the service request, wherein when the services in the class translate a first document from a first language into a second language, then the service data feature patterns include features selected from a group consisting of document language, document genre, number of words in the document, type of words in the document, document domain, document readability, and sentence length in the document, wherein when the first document is an audio document, then the exemplary data feature patterns include features selected from a group consisting of bit rate, amplitude, and energy, and wherein when the first document is video document, then the exemplary data feature patterns include features selected from a group consisting of frame rate, size, colors, energy, shot length, and containing or not containing people.

17. The method of claim 15, further comprising:

representing the request data features of the service request with a first vector and the service data feature pattern of each service with a second vector, wherein the first and second vector have components comprising average file size, data language, and data features useful in differentiating among services in a class, wherein the matching the request data features against the service data feature pattern of the services includes comparing the first vector against the second vectors representing each service, wherein the second vector representing the first service most closely matches the first vector representing the service request, and wherein a degree of match between the first vector and the second vector is based on a Euclidean distance between the first vector and the second vector.

18. The method of claim 15, further comprising:

obtaining a service quality measurement for a service, the service quality measurement indicating satisfaction of a user, wherein the service quality measurement is based on explicit feedback or implicit feedback from the user, wherein automatically generated surveys gather the explicit feedback about the service, and wherein multiple re-use of the service by the user determines a positive implicit feedback value for the service and non re-use determines a negative implicit feedback value for the service.

* * * * *